Nov. 26, 1935.                B. T. BROOKS                 2,022,274
                  METHOD FOR DRYING ALCOHOLS AND ESTERS
                     Filed Sept. 15, 1931      3 Sheets-Sheet 1
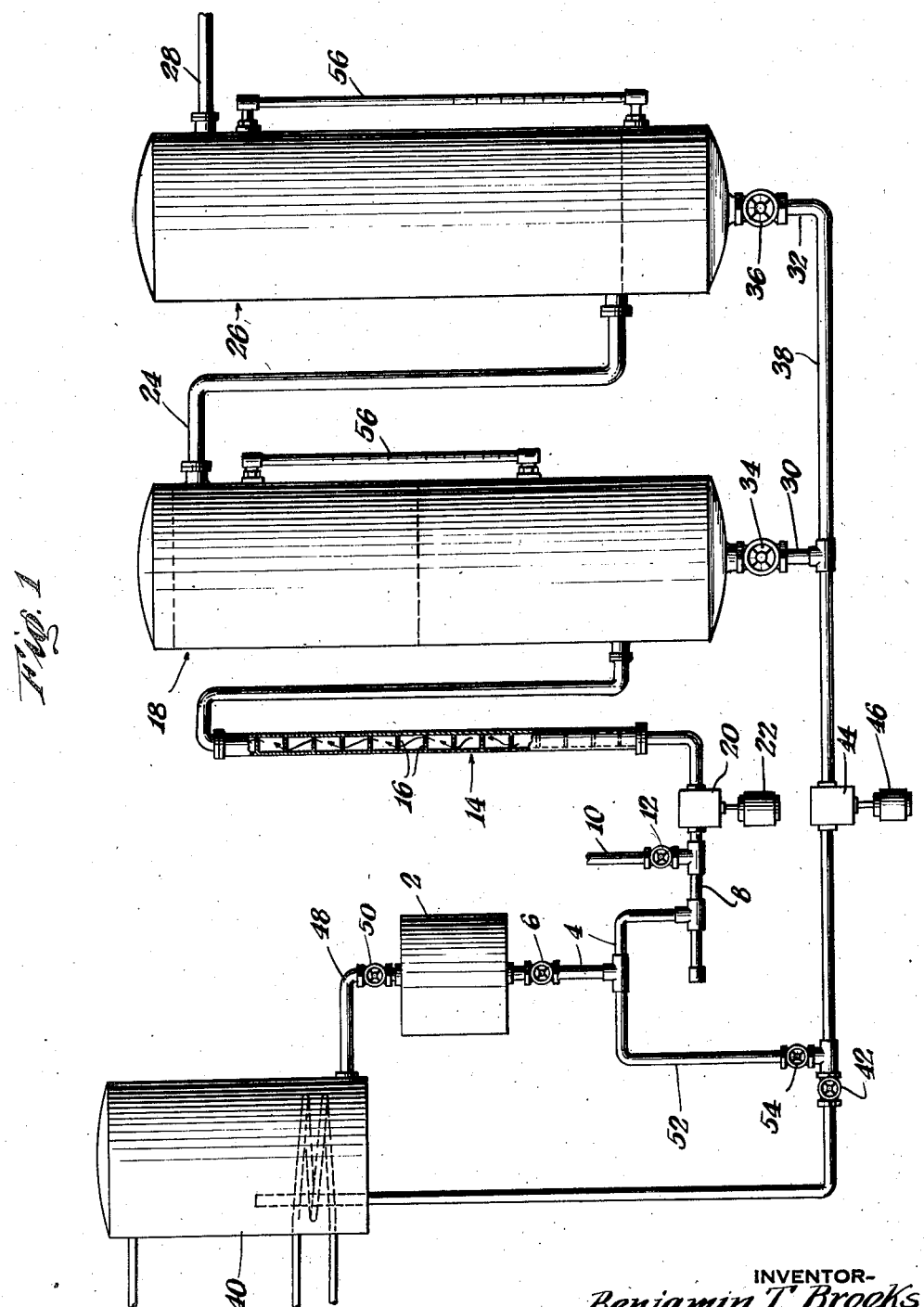
INVENTOR-
Benjamin T. Brooks
BY
Hoguet & Neary
ATTORNEYS Nov. 26, 1935.   B. T. BROOKS   2,022,274
METHOD FOR DRYING ALCOHOLS AND ESTERS
Filed Sept. 15, 1931   3 Sheets-Sheet 2
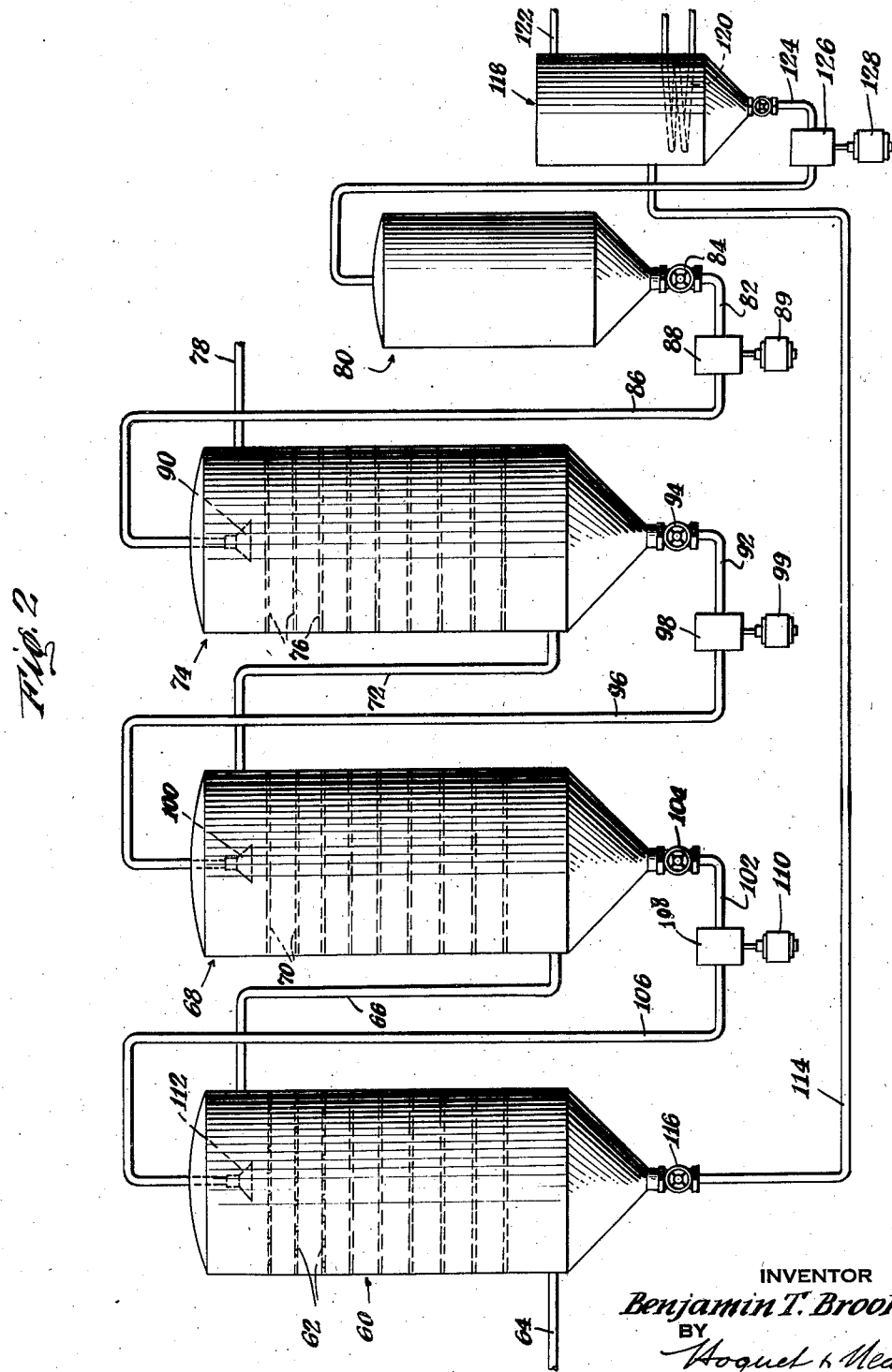
INVENTOR
*Benjamin T. Brooks*
BY
*Hoguet & Neary*
ATTORNEYS

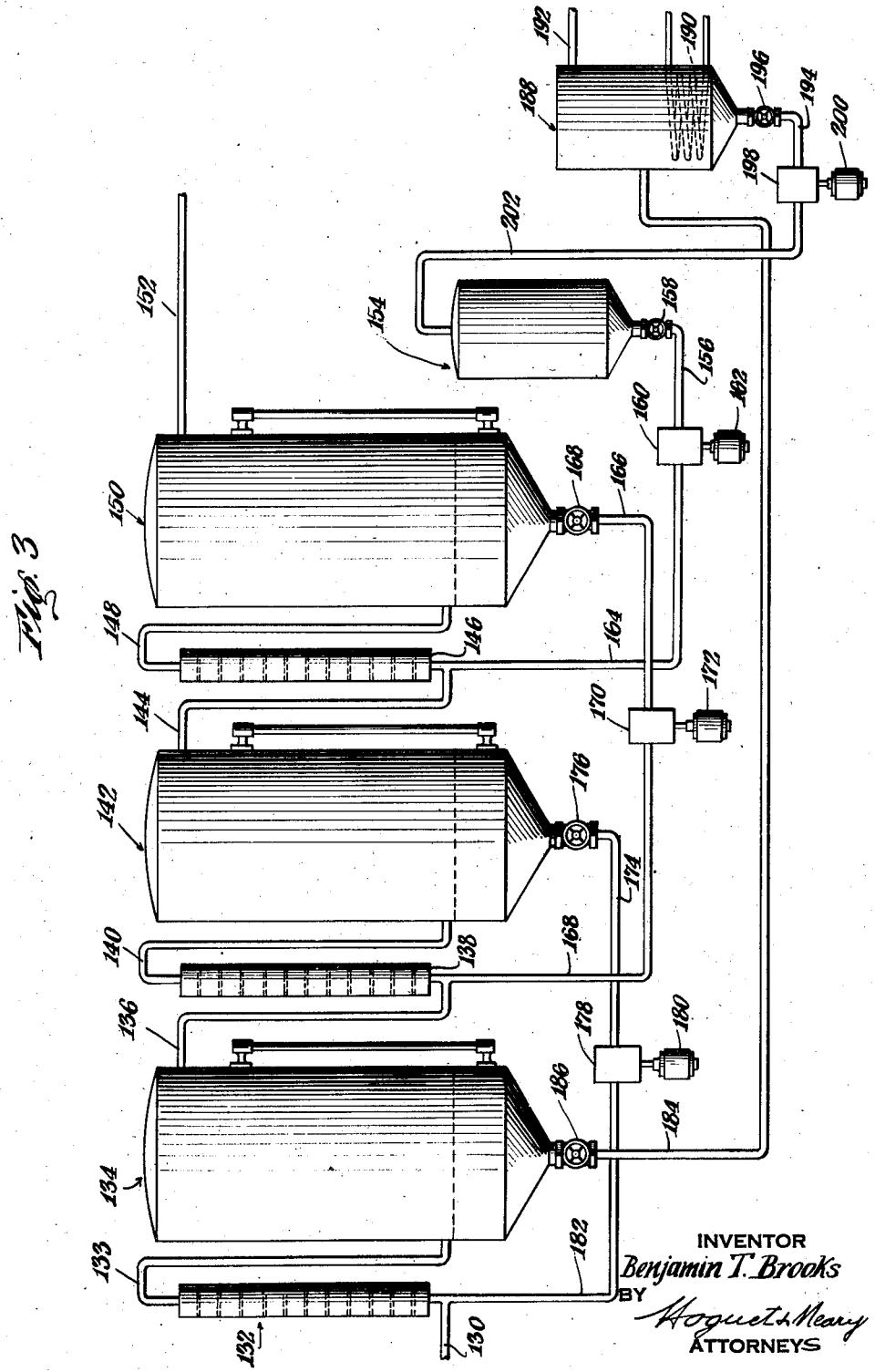

Patented Nov. 26, 1935

2,022,274

UNITED STATES PATENT OFFICE 2,022,274

METHOD FOR DRYING ALCOHOLS AND ESTERS

Benjamin T. Brooks, Greenwich, Conn., assignor, by mesne assignments, to Standard Alcohol Company, Wilmington, Del., a corporation of Delaware Application September 15, 1931, Serial No. 562,980

12 Claims. (Cl. 260—106)

My invention relates to the drying of solvents and more particularly to drying the common solvent alcohols and their esters such as isopropyl, primary and secondary butyl and primary and secondary amyl alcohols and their esters.

Up to the present time, the common solvent alcohols have been dried by contacting them with anhydrous compounds such as sodium sulphate, copper sulphate, potassium carbonate, and in rare instances, by solid caustic soda or potash. The esters generally have been dried by the use of neutral anhydrous compounds such as sodium sulphate, calcium chloride and the like. The use of such anhydrous solid substances has proved to be expensive, inefficient, incomplete, and generally objectionable, due to the difficulty of contacting all of the liquid solvent with the dry substances. A further objection to the use of such solid drying substances resides in the reconditioning of them for reuse. In such reconditioning, the substances must ordinarily be reconcentrated and fused to drive off the moisture. The fused mass must then be formed into flakes or finely comminuted form requiring expensive apparatus and processes.

The main object of my invention is to eliminate the objectionable features of the prior methods by employing a drying agent which has not heretofore been used for this purpose and which obviates all of the objections of the prior methods as it operates quickly, efficiently and completely.

In the drawings:

Figure 1 is a view of an apparatus such as may be used in the continuous operation of my process.

Figure 2 is a representation of an apparatus suitable for practising my invention using a continuous counter-current process.

Figure 3 represents a modification of the apparatus shown in Figure 2.

My invention is based on the discovery that a very concentrated solution of caustic alkali, such as caustic soda, or caustic potash, or very concentrated solutions of hygroscopic salts such as calcium chloride or zinc chloride, can be employed to remove the moisture from and dry the common solvent alcohols and their esters, particularly the acetates. Accordingly, when I refer hereinafter in the specification and claims to caustic alkali the same is to be understood to include caustic soda, caustic potash, and their equivalents. It is well known that alcohols are more or less miscible with water and that dilute alkalies will saponify esters. I have found, however, that the common solvent alcohols and their esters are not miscible with concentrated solutions of alkalies containing over 40% of alkali, particularly when employed at such temperatures that the solutions are substantially saturated. Such concentrations of alkali will not saponify esters at ordinary temperatures but will remove moisture from such solvents when admixed therewith and then separated therefrom.

This property of the alkali solution of being immiscible with the solvents appears to be due to a salting out effect of the alkali but I do not wish to be restricted to any particular theory. Since the solution of alkali is immiscible with the solvents and has a different specific gravity, it may be readily separated from the solvents by allowing the mixture to stand for a short space of time whereupon the mixture will stratify into layers of dry solvent and alkali solution.

My invention accordingly resides in the treatment of wet solvent alcohols, their esters, or a mixture of alcohols and esters with a solution of a caustic alkali containing over 40% caustic alkali and preferably about 50% or a concentrated or substantially saturated solution of a hygroscopic salt to dry the solvents. The process is preferably carried out at low temperatures ranging from 0° to 20° C. such that the alkali or salt solution is substantially saturated and yet at such temperatures that the solution is fluid and will flow readily. In carrying out my process, the amount of water present in the solvent is determined, and an amount of the solution of caustic alkali sufficient to take up all of the water without diluting it to below 40% is added to and thoroughly admixed with the wet solvent. The mixture is then allowed to stand, whereupon the alkali or salt solution will rapidly settle to the bottom of the container, separating from the dry solvent, which may be withdrawn from the top. The separated alkali or salt solution may be reconcentrated and used to treat other wet solvent. The preferred material is a solution of caustic soda containing about 50% of sodium hydroxide. The hygroscopic salts, such as calcium chloride and zinc chloride, are less preferable owing to their greater solubility in the alcohols and esters. In the following detailed description, I will refer to the use of caustic alkali but it is to be understood that the hygroscopic salts may be used in place thereof without modifying the process or apparatus and it is my intention to have my invention cover the use of such salts in such processes.

The drying solution will have a greater drying capacity if I use a solution containing crystals of undissolved alkali such as the mono- and dihydrates, insufficient, however, to destroy the fluidity of the solution. Also, when a substantially saturated solution is employed at say 20° C. and becomes diluted somewhat by taking up water from the material treated, its efficiency may be restored to some extent by cooling it to say 10° or 0° C. whereby the solution may again become substantially saturated.

By this process the alcohol or ester or mixture of the same is quickly and completely dried. When alcohols are so treated, they dissolve only negligible amounts of the alkali which may be recovered by distillation. Furthermore, only negligible amounts of the solvents are absorbed and dissolved in the alkali solution, thereby rendering it unnecessary to employ distillation to recover the solvent from the drying agent. For example, when esters such as isopropyl, butyl and amyl acetates containing from 10% to 20% of free alcohols are treated by this process, not more than one-half to one percent of such alcohols are extracted from the mixture treated.

This process is particularly applicable to the drying and purifying of esters produced by the action of acids such as acetic on alcohols such as isopropyl, butyl and amyl. The products resulting from this process usually consist of a mixture of ester, alcohol, water and acid. When such product is treated by my process, the acid is neutralized and removed simultaneously with the water. When treating solvents containing acids, it is advisable to cool the containing vessel to prevent the temperature from rising to the point where appreciable saponification of the esters might result. Such cooling is not always necessary and obviously depends on the concentration and amount of the acid and of the alkali.

The rapidity with which the operations of my process may be performed causes it to be particularly adaptable for continuous operation, as will be hereinafter described in conjunction with the apparatus shown in the drawings.

Referring to Figure 1 of the drawings, a storage tank 2 is provided for containing a solution of concentrated alkali. This tank 2 is connected by a conduit 4 and valve 6 to a conduit 8. Another conduit 10, leading from a suitable source of supply for the solvent, has a valve 12 and is connected with the conduit 8. The conduit is connected to an upwardly extending mixing column 14 containing perforated plates 16 which cause the flow of fluid therethrough to be turbulent, thereby effecting a thorough admixture of the fluids passing therethrough. The column 14 is connected to the settling tank 18 at a point spaced from the bottom thereof. Any suitable means, such as a pump 20 operated from a motor 22 or other suitable means, may be provided for forcing the fluids through the column 14 and into the tank 18.

A conduit 24 leads from adjacent the top of the tank 18 to a point spaced from the bottom of a second settling tank 26. The settling tank 26 is provided with a draw-off conduit 28 which leads to a suitable storage tank (not shown). Suitable draw-off conduits 30 and 32 provided with valves 34 and 36 respectively lead from the bottoms of tanks 18 and 26 and are connected to the conduit 38 which delivers into a suitable evaporator 40 through a valve 42. A suitable pump 44 operated from a motor 46 or other suitable means, is provided for forcing liquid through the conduit 38 and into the evaporator. The evaporator is connected to the storage tank 2 by means of a conduit 48 provided with a valve 50. A conduit 52 provided with a valve 54 connects conduit 38 to conduit 4. Each of the settling tanks may be provided with a suitable sight glass 56.

My continuous process using the above described apparatus may be practiced as follows: The valves 6 and 12 are regulated to admit the proper proportions of alkali solution and solvent to the conduit 8 through which the fluids pass into the tank 18. During their passage through the conduit 8 and column 14 and particularly due to the action of the plates 16, the two fluids are thoroughly intermixed and the caustic alkali brought into contact with all portions of the solvent. In the tank 18 the two fluids rapidly form into two layers due to the difference of their specific gravities, and due to the fact that the two liquids are almost completely immiscible. The top layer, which comprises the solvent containing a small amount of entrained alkali solution is drawn off through conduit 24 into the second settling tank 26 wherein a complete separation of the two fluids takes place. The dried solvent is drawn off through conduit 28 to any suitable place of storage.

The solution of alkali settles to the bottoms of the tanks 18 and 26 from which it is drawn off through conduits 30, 32 and 38 and passed into the evaporator 40, where it is reconcentrated. The reconcentrated alkali passes to the storage tank to be reused and again passed through the cycle.

When the solvent contains only small amounts of water, it may become necessary to use large excesses of the alkali solution in order to cause all portions of the solvent to be contacted with the alkali. In such case, the alkali will not become so diluted by the extracted water as to become useless for my purpose and hence may be recycled one or more times without being reconcentrated. For this purpose the branch conduit 52 and valve 54 are provided. This branch conduit 52 and its valve may also be used for more closely regulating the degree of concentration as, by this means, part of the diluted alkali from the settlers may be admixed with the concentrated alkali flowing from the storage tank 2.

While in Figure 1, I have shown and have described the use of two settling tanks, it will be appreciated that I may use a lesser or a larger number. Where only one settling tank is used the flow of liquid therethrough must be regulated so that a substantially complete separation of the alkali and the solvent takes place therein. By using two settling tanks the flow of liquid through the first tank may proceed at such a rate that a complete separation does not take place and any alkali solution carried through such tank by the solvent will settle in the second tank. While I may use three or more settling tanks I prefer to use only two, as this permits a more complete mixture of the liquids in the mixing column.

In some instances, I have found it to be preferable to employ the apparatus such as disclosed in Figures 2 and 3, operating under the continuous counter-current flow principles. In the apparatus as disclosed in Figure 2, alcohol or ester is admitted to the tank 60 provided with perforated plates 62 from a suitable conduit 64 connected with a source of supply, not shown. The solvent passes upwardly through the tank and the perforated plates and outwardly from the top through the conduit 66 to another similar tank 68, also provided with perforated plates 70. The solvent passes upwardly through the tank 68 through the perforated plates 70 and outwardly through a conduit 72 to a point spaced from the bottom of tank 74 provided with perforated plates 76. The solvent passes upwardly through this tank 74 and the plates 76 and outwardly from the top thereof through a conduit 78 to a suitable storage tank, not shown. A solution of caustic alkali is drawn off from the storage tank 80 through the conduit 82 provided with a valve 84 and is forced upwardly through the conduit 86 by means of pump 88, operated by a motor or other suitable means 89 and out through a rose or other suitable distributing member 90 positioned above the level of the solvent in the tank 74. The sprayed alkali solution flows downwardly through the tank and the perforated plates, intimately mixing with and contacting with all portions of the solvent and settling on the bottom of the tank.

The alkali settling on the bottom of this tank is drawn off through conduit 92 provided with a valve 94 and is forced upwardly through the conduit 96 by means of the pump 98 or other suitable means, operated by a motor or other suitable means 99 and is forced through the rose 100 or other suitable distributing device positioned above the level of the solvent in tank 68 wherein the same action takes place as in tank 74. The settled alkali from this last mentioned tank is drawn off through conduit 102 provided with valve 104 and is forced upwardly through conduit 106 by means of pump 108 operated by a motor or other suitable means 110 and outwardly through the rose or other suitable distributing device 112 in the form of a spray above the level of the solvent in tank 60 wherein it contacts and intermixes with more solvent in the same manner as heretofore described with relation to tank 74 and settles to the bottom of this tank. The settled alkali in tank 60 is drawn off through conduit 114 provided with valve 116 and is passed to the concentrator 118 provided with steam coil 120 or other suitable means for heating and concentrating the solution of alkali. Steam passes off from the concentrator through conduit 122. The concentrated alkali is drawn off from the concentrator through the valve controlled conduit 124 by means of pump 126 operated by a motor or other suitable means 128 which forces the concentrated alkali into the storage tank 80 from which it is drawn off to be again passed through the cycle. The conduits 96 and 106 may be provided with suitable cooling means if desired, and conduits 82 and 86 or storage tank 80 may be provided with any suitable means for warming the alkali solution.

It will be noted that in this process, using the above described apparatus, the very wet solvent is treated with a relatively dilute solution of caustic alkali in tank 60 and the partially dried solvent then passes to tank 68 where it is treated with a more concentrated solution of alkali, and the almost dried solvent is then treated with the most concentrated solution of alkali in tank 74. While it is not necessary to always use warming and cooling devices as described I have found that the use of such devices is sometimes preferable. By the use of such devices a very concentrated solution of caustic alkali containing crystals of the mono-hydrate and di-hydrate may be stored in the storage tank 80 and by heating such storage tank and the conduit leading therefrom to the desired amount such highly concentrated solution can be made freely fluid so that it may be passed through the pump 88 and distributor 90. On this highly concentrated solution passing through the tank 74 it becomes somewhat diluted by means of the water removed from the solvent in such tank and then by cooling this somewhat diluted alkali as it passes through conduit 96 its efficiency is restored prior to its admission to tank 68. On passing through tank 68 the solution of alkali again becomes somewhat diluted and by further cooling the same as it passes through conduit 106 its efficiency is again at least partially restored before it is admitted to tank 60. It will be readily appreciated that by the process above described the wettest solvent is treated with the most dilute alkali and the driest solvent is treated with the most concentrated or saturated alkali, thereby obtaining a very efficient and complete drying of the solvent, using a continuous counter-current process.

Figure 3 shows a modification of the apparatus shown in Figure 2. In this Figure 3, solvent from any suitable source is forced through conduit 130 and into a mixing column 132 similar in all respects to the mixing column 14 shown in Figure 1, and in which the solvent is intimately mixed with a concentrated solution of alkali. The mixed liquids flow from the top of the column 132 into a suitable settling tank 134 similar in all respects to settling tanks shown in Figure 1. Partly dried solvent is drawn off from the top of this tank through conduit 136 and flows through mixing column 138 where it is mixed with a new solution of alkali. The mixed fluids pass off from the top of column 138 through the conduit 140 into the settling tank 142. Partially dried solvent is drawn off from the top of this settling tank 142 through conduit 144 and passes through the mixing column 146 where it is mixed with another and more highly concentrated solution of alkali. The mixed fluids are drawn off from the top of this column through conduit 148 to settling tank 150. The completely dry solvent is drawn off from the top of this last mentioned settling tank through conduit 152 to a suitable storage tank (not shown). A suitable storage tank 154 for the alkali solution is provided from which alkali is drawn off through conduit 156 provided with valve 158 by means of pump 160 operated by a motor or other suitable means 162 which forces the concentrated alkali solution through conduit 164 to column 146 wherein it is mixed with nearly dry solvent. The alkali settling in tank 150 is drawn off through conduit 166 provided with valve 168 by means of pump 170 operated by a motor or other suitable means 172 and forced upwardly through conduit 168 and column 138 wherein it is mixed with partially dried solvent. The alkali solution settling in tank 142 is drawn off from the bottom thereof through conduit 174 provided with valve 176 by means of pump 178 operated by a motor or other suitable means 180 and upwardly through conduit 182 and column 132 wherein it is mixed with fresh wet solvent and flows through conduit 133 to tank 134. The diluted alkali solution settling in tank 134 is drawn off from the bottom thereof through conduit 184 and valve 186 and flows to the concentrator 188 provided with a heating coil 190 or other suitable means for reconcentrating the solution of alkali. A conduit 192 adjacent the top of concentrater 188 is provided to permit steam and water vapors to pass off from the concentrator. The concentrated alkali is drawn off from the concentrator by means of conduit 194 provided with valve 196 by means of pump 198 operated by a motor or other suitable means 200 which causes the concentrated solution to flow through conduit 202 and into storage tank 154. As in the apparatus illustrated in Figure 2 the storage tank 154 and conduit 156 may be heated by any suitable means and the conduits 168 and 182 and columns 138 and 132 may be cooled by any suitable means. The heating and cooling means are provided for the same purposes and may be employed in the same way as those heretofore described in relation to the apparatus shown in Figure 2. The apparatus of Figures 2 and 3 operate under the same general principles and the use of one or the other will depend largely upon the materials being treated and the cost of manufacture in the locality in which they are used.

While I have shown and described specific apparatus and the manner of operating the same for practising my invention, it will be understood that such description is solely for the purpose of illustration and that other apparatus may be employed and that shown and described may be modified in many ways. It will also be understood that many modifications may be made in the manner of practising my invention without departing from the principles and spirit thereof. Accordingly, the scope of my invention is to be limited solely by the following claims and the prior art.

I claim:

1. The method of drying organic alcohols and carboxylic acid esters of 3 or more carbon atoms, which comprises treating a compound of the group consisting of organic alcohols and carboxylic esters of three or more carbon atoms with a concentrated aqueous solution of caustic alkali and separating the dried compound.

2. Method according to claim 1, in which the alkali solution contains over 40% of alkali.

3. The method of drying organic alcohols and carboxylic acid esters of 3 or more carbon atoms, which comprises treating a compound of the group consisting of organic alcohols and carboxylic esters of three or more carbon atoms with a concentrated solution of caustic alkali immiscible with the compound to be dried, and separating the dried compound from the alkali solution by stratification and withdrawal of the dried compound.

4. Method according to claim 3, in which the alkali solution contains about 50% of alkali.

5. The method of drying organic alcohols and carboxylic acid esters of three or more carbon atoms adapted for use as solvents, in a cyclic process, which comprises continuously mixing a solvent of the group consisting of organic alcohols and carboxylic esters of three or more carbon atoms with a concentrated aqueous solution of alkali, separating the solvent from the solution of alkali and recycling the solution of alkali.

6. The method of drying organic alcohols and carboxylic acid esters of three or more carbon atoms adapted for use as solvents, in a cyclic process, which comprises continuously admixing a stream of a concentrated aqueous alkali solution with a stream of a solvent of the group consisting of organic alcohols and carboxylic esters of three or more carbon atoms, continuously passing said mixture into a settling chamber, continuously drawing off separated dried solvent from said chamber and continuously drawing off settled alkali solution from said chamber and returning it to the cycle to be admixed with the stream of solvent.

7. The method of drying organic alcohols and carboxylic acid esters of three or more carbon atoms adapted for use as solvents, which comprises contacting a solvent of the group consisting of organic alcohols and carboxylic esters of three or more carbon atoms with a concentrated aqueous substantially saturated solution of caustic alkali, separating the solution of caustic alkali from the solvent, cooling the solution of caustic alkali to a temperature where it becomes substantially saturated, and contacting new portions of the solvent with the cooled solution.

8. The method of drying organic alcohols and carboxylic acid esters of three or more carbon atoms adapted for use as solvents, which comprises passing a solvent of the group consisting of organic alcohols and carboxylic esters of three or more carbon atoms in a continuous flow through a suitable apparatus and continuously passing a concentrated aqueous solution of caustic alkali through the apparatus countercurrent to the flow of the solvent and in intimate contact therewith.

9. The method of drying organic alcohols and carboxylic acid esters of three or more carbon atoms adapted for use as solvents, which comprises passing a solvent of the group consisting of organic alcohols and carboxylic esters of three or more carbon atoms in a continuous flow through a suitable apparatus, continuously passing a concentrated aqueous solution of caustic alkali through the apparatus countercurrent to the flow of the solvent and in intimate contact therewith, withdrawing dried compound from one end of the apparatus, withdrawing diluted solution of caustic alkali from the other end of the apparatus, reconcentrating the diluted solution of caustic alkali and returning it to the cycle.

10. In a process of drying organic alcohols and carboxylic acid esters of three or more carbon atoms adapted for use as solvents, which comprises passing a solvent of the group consisting of organic alcohols and carboxylic esters of three or more carbon atoms successively through a series of settling tanks, mixing a concentrated aqueous solution of caustic alkali with the compound just prior to passing it into the last tank in the said series, withdrawing the settled diluted solution of caustic alkali from the bottom of each tank in the series except the first and admixing it with the solvent entering the next preceding tank and withdrawing the settled diluted solution from the first tank of the series.

11. In a process of drying organic alcohols and carboxylic acid esters of three or more carbon atoms adapted for use as solvents, which comprises passing a solvent of the group consisting of organic alcohols and carboxylic esters of three or more carbon atoms successively through a series of settling tanks, mixing a concentrated aqueous solution of caustic alkali with the solvent just prior to passing it into the last tank in the said series, withdrawing settled diluted solution of caustic alkali from the bottom of each tank in the series except the first and admixing it with the compound entering the next preceding tank, withdrawing settled diluted solution from the first tank of the series, reconcentrating the settled diluted solution withdrawn from the first tank of the series and admixing it with the solvent entering the last tank of the series.

12. In a process of drying organic alcohols and carboxylic acid esters of three or more carbon atoms adapted for use as solvents, which comprises passing a solvent of the group consisting of organic alcohols and carboxylic esters of three or more carbon atoms successively through a series of settling tanks, mixing a concentrated aqueous solution of caustic alkali with the solvent just prior to passing it into the last tank in the said series, withdrawing settled diluted solution of caustic alkali from the bottom of each tank in the series except the first and admixing it with the solvent entering the next preceding tank, withdrawing settled diluted solution from the first tank of the series, and cooling the settled diluted solution of caustic alkali withdrawn from each tank of the series except the first before admixing the solution with the solvent.

BENJAMIN T. BROOKS.